(12) United States Patent  
Winkelmann et al.

(10) Patent No.: US 8,286,775 B2
(45) Date of Patent: Oct. 16, 2012

(54) CLUTCH RELEASE BEARING IN CONTACT WITH A DISK SPRING

(75) Inventors: Ludwig Winkelmann, Erlangen (DE); Steffen Dittmer, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1168 days.

(21) Appl. No.: 11/917,825

(22) PCT Filed: Jun. 17, 2006

(86) PCT No.: PCT/EP2006/005825
§ 371 (c)(1),
(2), (4) Date: Dec. 17, 2007

(87) PCT Pub. No.: WO2007/006394
PCT Pub. Date: Jan. 18, 2007

(65) Prior Publication Data
US 2008/0210515 A1    Sep. 4, 2008

(30) Foreign Application Priority Data
Jul. 13, 2005    (DE) .......................... 10 2005 032 676

(51) Int. Cl.
*F16D 23/14*    (2006.01)

(52) U.S. Cl. ..................... 192/98; 192/89.23; 192/110 B
(58) Field of Classification Search ............... 192/89.23, 192/89.24, 89.25, 98
See application file for complete search history.

(56) References Cited

U.S. PATENT DOCUMENTS
4,969,755 A * 11/1990 Parzefall ....................... 384/612

FOREIGN PATENT DOCUMENTS

| DE | 3743853 | 7/1989 |
|---|---|---|
| DE | 69721193 | 2/2004 |
| EP | 1471068 | 4/1977 |
| EP | 0194376 | 9/1986 |
| EP | 0321757 | 6/1989 |
| EP | 1538359 | 6/2005 |
| FR | 2459921 | 1/1981 |
| FR | 2518678 | 6/1983 |
| GB | 2196086 | 4/1988 |

* cited by examiner

*Primary Examiner* — David D Le
*Assistant Examiner* — Ryan Dodd
(74) *Attorney, Agent, or Firm* — Volpe and Koenig, P.C.

(57) ABSTRACT

A clutch release bearing (21) that is in contact with a disk spring is provided. The clutch release bearing (21) includes at least one curved contact surface (12, 28, 30, 33) that is located at a radial distance from the axis of rotation (4) of the clutch release bearing (21) and is used for contacting at least one end (39) of at least one spring tongue (40) of the disk spring.

14 Claims, 7 Drawing Sheets

CLUTCH RELEASE BEARING IN CONTACT WITH A DISK SPRING

BACKGROUND

The invention relates to a clutch release bearing in contact with a disk spring, wherein the clutch release bearing has at least one curved contact surface, which is located at a radial distance from the axis of rotation of the clutch release bearing and which is used for contacting at least one end of at least one spring tongue of the disk spring.

DE 37 438 53 A1 describes a clutch release bearing of the class-defining type. The contact surface is constructed either on the inner ring or on an outer ring of the clutch release bearing. The ends of the spring tongues are in touching contact with the contact surface. Here, the contact surface is either an annular surface extending about the axis of rotation or alternatively several segment-like contact surfaces adjacent to each other on the peripheral side are constructed on the clutch release bearing. If several of the segment-like contact surfaces are constructed on the clutch release bearing, as described in DE 37 438 53 A1, for example, ribs are provided between the contact surfaces for engagement between the spring tongues.

When the clutch disengages, the peripheral contact surface on the bearing ring of the release bearing is pressed with force onto the spring tongue(s). The spring tongues therefore move in the axial direction. The contact, at which the spring tongues meet the contact surface, shifts during the moving on the contact surface radially inward in the direction of the axis of rotation of the release bearing or radially away from the axis of rotation. The contact also shifts with increasing wear in the clutch.

The ends of the spring tongues meeting the contact surface are therefore often curved, so that they bulge convexly outward to the contact surface on the bearing and so that these always run with a linear contact to the contact surface often also curved convexly in the direction of the end on the spring tongue during the inward and outward yielding. An example of such a release bearing arrangement is described in DE 37 438 53 A1.

However, there are also clutch or vehicle manufacturers that, for various reasons, use disk springs, whose ends of the spring tongues are constructed straight. Such a release bearing arrangement is described in EP 015 383 59 A1. The ends usually stand in contact with a curved contact surface. These release bearing arrangements as a rule have an optimum linear contact at only one operating point, wherein this linear contact transforms into a two-point contact in a radial direction and becomes increasingly less in the other radial direction and finally ends at a single-point contact. When the clutch is actuated, the contact is shifted radially outward into a single-point contact and for movement due to wear it is shifted into a two-point contact. Such reductions of the contact lead to high surface pressures and promote unacceptable wear due to the contact on the contact and touching faces. The contact effects on the release bearing arrangements of the state of the art are described with FIGS. 1 and 2.

FIG. 1 shows schematically the touching and contact relationships during the contact of a spring tongue for the release bearing arrangement as described in EP 015 383 59 A1. As an example, a part of an outer surface of a toroidal body 1 is considered as the curved contact surface. The toroidal body 1 is shown simplified by grid lines 2 and 3. The axial bulge of the contact surface is symbolized by the grid lines 2. The grid lines 2 run in planes, in which the axis of rotation 4 extends and which are aligned with the axis of rotation 4. Peripheral curvatures of the contact surface in planes, which are intersected at a right angle by the axis of rotation 4, are symbolized by the grid lines 3. The contact face of the non-curved end of a spring tongue is symbolized with the surface 5.

The surface line marked with 3.1 symbolizes the surface line 3.1 projecting farthest in the axial direction at the axial peak 3.1 of the contact surface. In FIG. 2, a longitudinal section through the body along the axis of rotation 4, the surface line 3.1 marks the turn-around point (peak) of a curve described in the longitudinal section by one of the grid lines 2.

The contact of the face 5 with the surface line 3.1 at the peak of the curve results in an optimum linear contact 6. The line described by the linear contact 6 is curved in FIG. 1 corresponding to the profile of the surface line 3.1. If the surface 5 tilted in the direction of the arrow 7 extends on the contact surface, in the end a two-point contact with the contacts 8 and 9 is produced. If the face 5 tilted in the direction of the arrow 10 extends on the contact surface, the linear contact becomes increasingly smaller until the face 5 and the contact surface are finally in a single-point contact at point 11.

SUMMARY

The object of the invention is to create a clutch release bearing, which generates optimum contact to the spring tongues, in order to reduce, in particular, the wear in the arrangement.

This objective is met with a clutch release bearing according to the features of Claim 1 and is constructed by the features of additional dependent claims.

The release bearing has several contact surfaces following one after the other on the peripheral side. The contact surfaces are either directly adjacent to each other and transition one into the other at bevels or the contact surfaces are separated from each other, so that, e.g., functional elements of the release bearing are arranged between the contact surfaces.

For example, a construction of the invention provides that between at least two of the contact surfaces following one after the other on the peripheral side, an axial rib-like projection is formed, wherein the axial projection is provided for engaging in a peripheral spacing between two of the peripheral spring tongues adjacent to each other. The projection is tapered like a roof in the axial direction.

The disk springs have an arbitrary number of spring tongues, which are distributed with equal spacing relative to each other or with different spacings on the periphery. The spring tongues of a disk spring have either the same shape or a different shape relative to each other. Preferably one of the ends or alternatively also several ends of a spring tongue are allocated to each of the contact surfaces.

Each of the contact surfaces is curved in the planes running longitudinally with the axis of rotation—but not in the peripheral direction. The contact surface is described by an arbitrary number of straight-line surface lines adjacent to each other and aligned parallel to each other in planes intersected at a right angle by the axis of rotation. Each of the surface lines is aligned tangential and in a straight line to an imaginary circle lying in one of the planes. The axis of rotation of the clutch release bearing intersects the circle in the center thereof at a right angle.

The contact surface is bulged convexly toward the end and is described by surface lines that correspond through one radius to the profile of the curve of an ellipse or that are convexly curved differently in any manner.

One construction of the invention provides that the contact surface is described by at least one segment of an outer surface of a cylinder. The axis of symmetry of the cylinder is aligned tangential to a circumferential line running about the axis of rotation and runs parallel to the surface lines. The parallel spacing between the axis of symmetry and each of the surface lines of the contact surface is preferably at least 5 mm and thus corresponds to the radius of the cylinder.

The contact surfaces are either fixed to the inner ring or to the outer ring of the clutch release bearing. Here, the contact surfaces are fixed either directly to the material of the relevant ring or to at least one thrust-carrying piece or the like. As materials for the inner ring, outer ring, or for the annular thrust-carrying piece, preferably a tempering steel such as C45; CF 53, C75 or a deep-drawing grade tool steel, such as C80 U, is used.

The contact surface carrying piece is produced, for example, as a deep-drawn, stamped, or extruded part and is subjected to a heat treatment. The contact surfaces are alternatively provided with a wear-resistant, heat-resistant surface with low roughness made from hard-material coatings, which are comprised of, e.g., plastic, hard materials, or ceramic or nickel-aluminum alloys. Also provided are layers made from materials with the trade name "Triondur"—coatings based on chromium or nitride chromium layers. The layers are deposited, for example, through plasma coating, sintering, chemical coating, or through spraying in a flame spraying, electric-arc spraying, plasma spraying, or high-speed spraying method or through cathode evaporation or sputtering, or a vacuum-supported or plasma-supported method.

The thrust-carrying piece or some other suitable component is made selectively, for example, from plastic, hard metal, hardened sheet steel, or some other suitable materials or various combinations of these materials. The thrust-carrying pieces are selectively snapped, bonded, welded, injection-molded (through spraying, casting, or similar deposition) onto the corresponding bearing ring or fixed in another suitable way with a positive, non-positive, or material fit on the bearing ring. Possible attachments are, e.g., non-positive connection through press fit, positive connection through snap-on connections, and material connections through soldering, ultrasonic welding, and hot stamping and bonding.

Alternative materials for the thrust-carrying pieces with contact surfaces or alternatively at least for the contact surfaces are thermoplastics or duroplastics. Preferred thermoplastics are, for example, high temperature-resistant polyamides, polyaryl ether ketones (PEAK). From the range of polyamides, preferably polyamide 46 (PA 46) or semi-aromatic polyamides, preferably polyphthalamide (PPA) or polyhexamethylene terephthalamide (PA6T) or copolymers, polyhexamethylene isophthalamide (PA6T/6I) and/or polyhexamethylene adipamide (PA6T/66, PA6T/6I/66) or polymethylpentamethylene terephthalamide (PA6T/MPMDT) with friction and wear reducing, as well as strength increasing additives can be used. Selected as suitable additives are carbon fibers and/or aramide fibers in a weight percentage of 1 to 40%, preferably carbon fibers with a weight percentage of 20 to 30%, aramide fibers with a weight percentage of 1 to 15%, and also solid lubricants, such as molybdenum disulfide with a weight percentage of 1 to 5%, together with or alternatively graphite in a weight percentage of 1 to 10%, together with or alternatively polytetrafluoroethylene (PTFE) in a weight percentage of 1 to 30%, preferably a PTFE percentage of 5 to 15 weight %, together with or alternatively polyphenylene sulfone (PPSo2, Ceramer) in a weight percentage of 1 to 30%, preferably 1 to 15 weight %.

The contact surface is formed through non-cutting shaping in the bearing rings and thrust-carrying pieces made from sheet metal preferably at the ends.

Hard metals are, for example, tungsten carbides or titanium-containing metals, which are provided with bonding agents and are sintered accordingly.

BRIEF DESCRIPTION OF THE DRAWINGS

The invention will be explained in more detail below with reference to embodiments. Shown are.

DETAILED DESCRIPTION OF THE PREFERRED EMBODIMENTS

Figure 1:
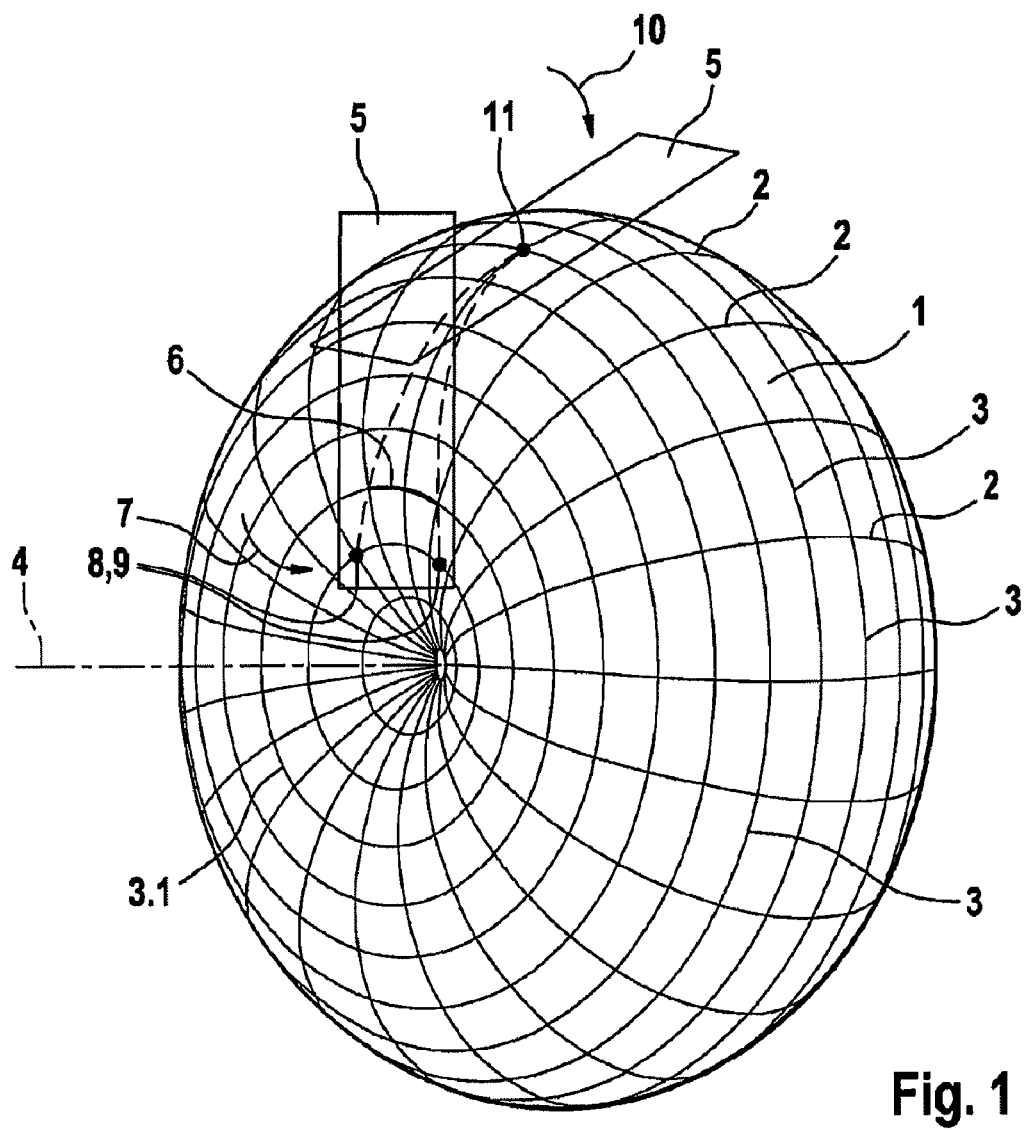
FIG. 1 a view showing the principle and the different contact relationships in the contact of a spring tongue with a contact surface on release bearings of the state of the art, FIG. 2 a partial section view aligned with the axis of rotation through the toroidal body according to FIG. 1, FIG. 3 a view showing the geometric relationships on the contact surfaces of an embodiment of the invention, FIG. 4 a longitudinal section view along the axis of rotation through an embodiment of a clutch release bearing, FIG. 5 a partial section view of an embodiment of a bearing ring, in which contact surfaces are formed on the peripheral side directly adjacent to each other, FIG. 6 a front view of a thrust-carrying piece with several peripheral contact surfaces separated from each other by ribs, FIG. 7 a longitudinal section view through the thrust-carrying piece according to FIG. 6 along the line VII-VII, FIG. 8 the detail Z from FIG. 7, enlarged and not true to scale, with the description of the geometry of one of the contact surfaces, FIG. 9 a sectioned partial view of a bearing ring with an attached thrust-carrying piece, FIG. 10 another partial view of a bearing ring with an attached thrust-carrying piece in section, FIG. 11 a sectioned partial view of a bearing ring with an attached thrust-carrying piece, FIG. 12 a partial section view longitudinally through another embodiment of an inner ring, on which contact surfaces are formed directly, FIG. 13 a partial section view through an inner ring produced through cold forming with stamped contact surfaces.
Figure 2:
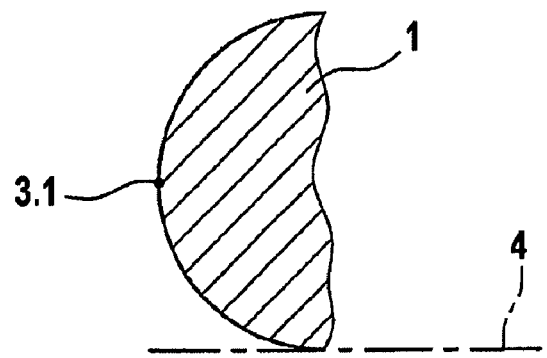

The illustrations in FIGS. 1 and 2 are described in the section "Background of the Invention."

Figure 3:
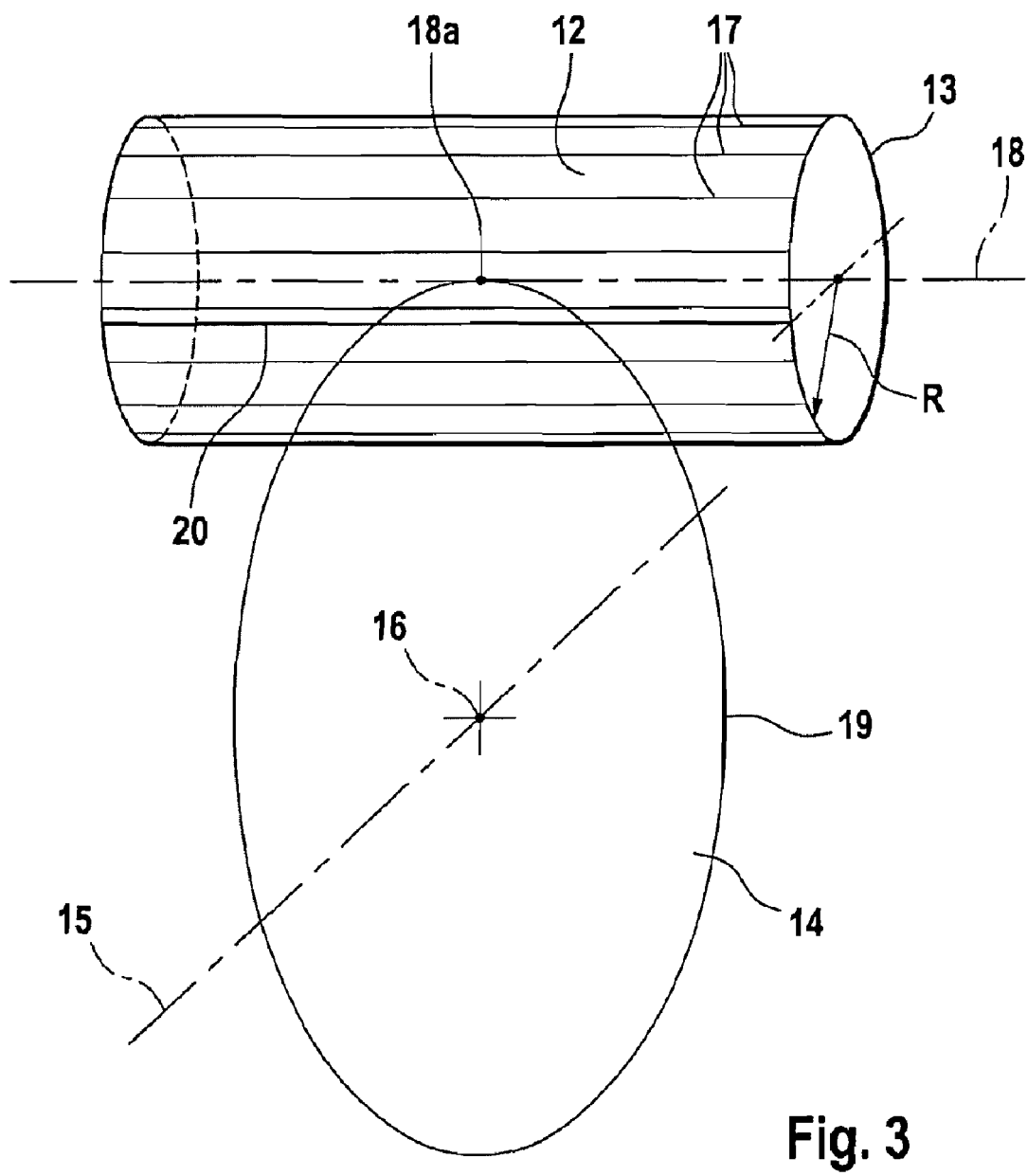

FIG. 3 shows a rough schematic of an example for the geometric relationships of a contact surface 12. The contact surface 12 is a partial face of a cylinder 13. The axis of symmetry 18 of the cylinder 13 tangentially crosses the circumferential line 19 of a circle 14 or a circular plane 14 at an intersecting point 18a. The axis of rotation 15 of a release bearing not shown in more detail intersects the circular plane 14 in the center 16 of the circle 14. The contact surface 12 is described by an arbitrary number of surface lines 17 and is curved in planes aligned with the axis of rotation 15. The surface lines 17 of the contact surface 12 are aligned to each other and to the axis of symmetry 18 of the cylinder 13 and thus also in the plane of the image parallel to each other. Because the contact surface 12 is a partial face of a cylinder 13, R is the radius of the cylinder and therefore equal as the spacing for all surface lines 17 relative to the axis of symmetry 18.

The spacing between each surface line and an imaginary axis in the same position as the axis of symmetry becomes increasingly greater as an alternative to the construction described above the farther the surface line is removed from the peak line 20. On cam-shaped contact surfaces, as an alternative this spacing becomes increasingly smaller the farther the surface line is removed from the peak line.

Figure 4:
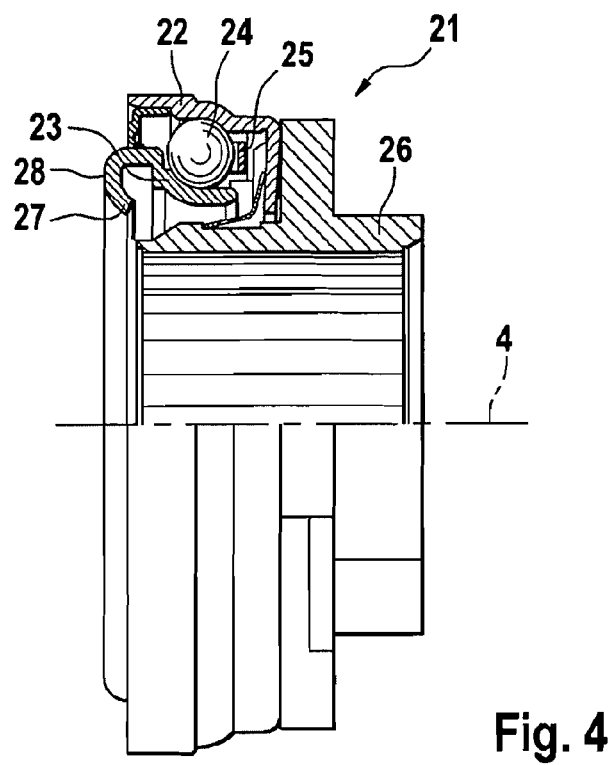

FIG. 4 shows a clutch release bearing 21 made of an outer ring 22, an inner ring 23, balls 24 in a cage 25, and a guide and centering sleeve of the clutch release housing 26. The inner ring 23 has contact surfaces 28 on a rim 27 displaced radially inward through cold forming. The contact surfaces 28 are stamped into the rim 27. Corresponding contact surfaces can also be constructed on the guide and centering sleeve as an alternative to the just mentioned variant.

Figure 5:
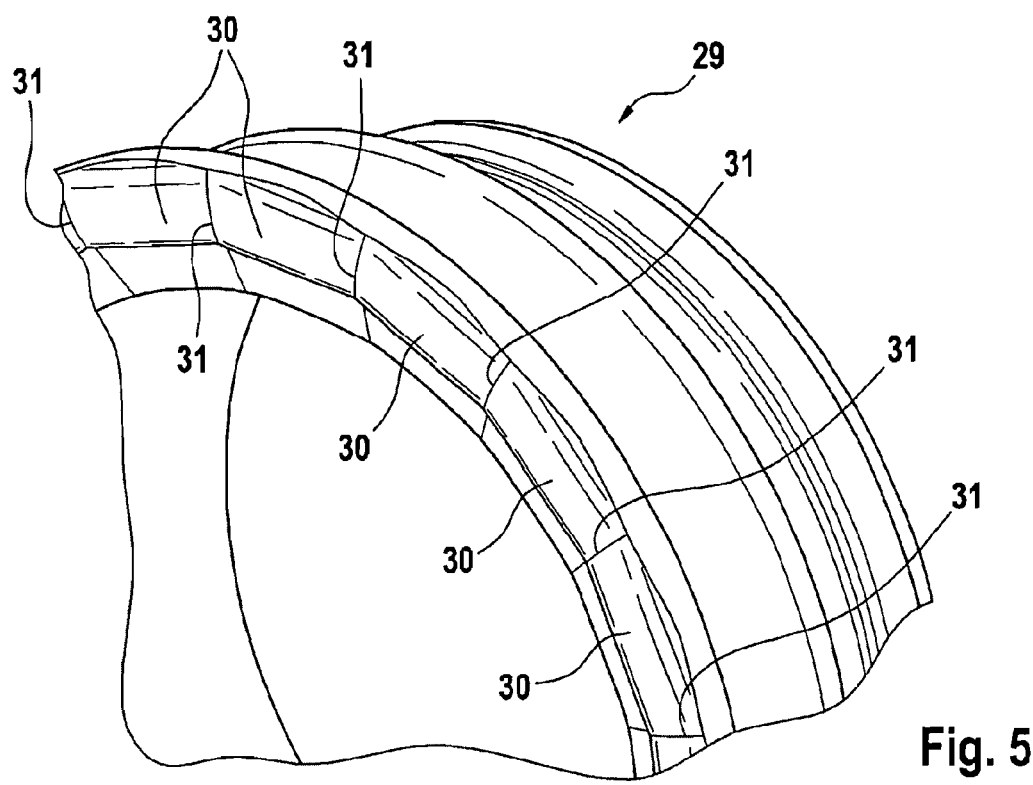

FIG. 5 shows a bearing ring 29, an inner ring or an outer ring, on which contact surfaces 30 of the release bearing according to the invention are stamped, which are directly adjacent to each other and which transition one into the other at bevels 31.

Figure 6:
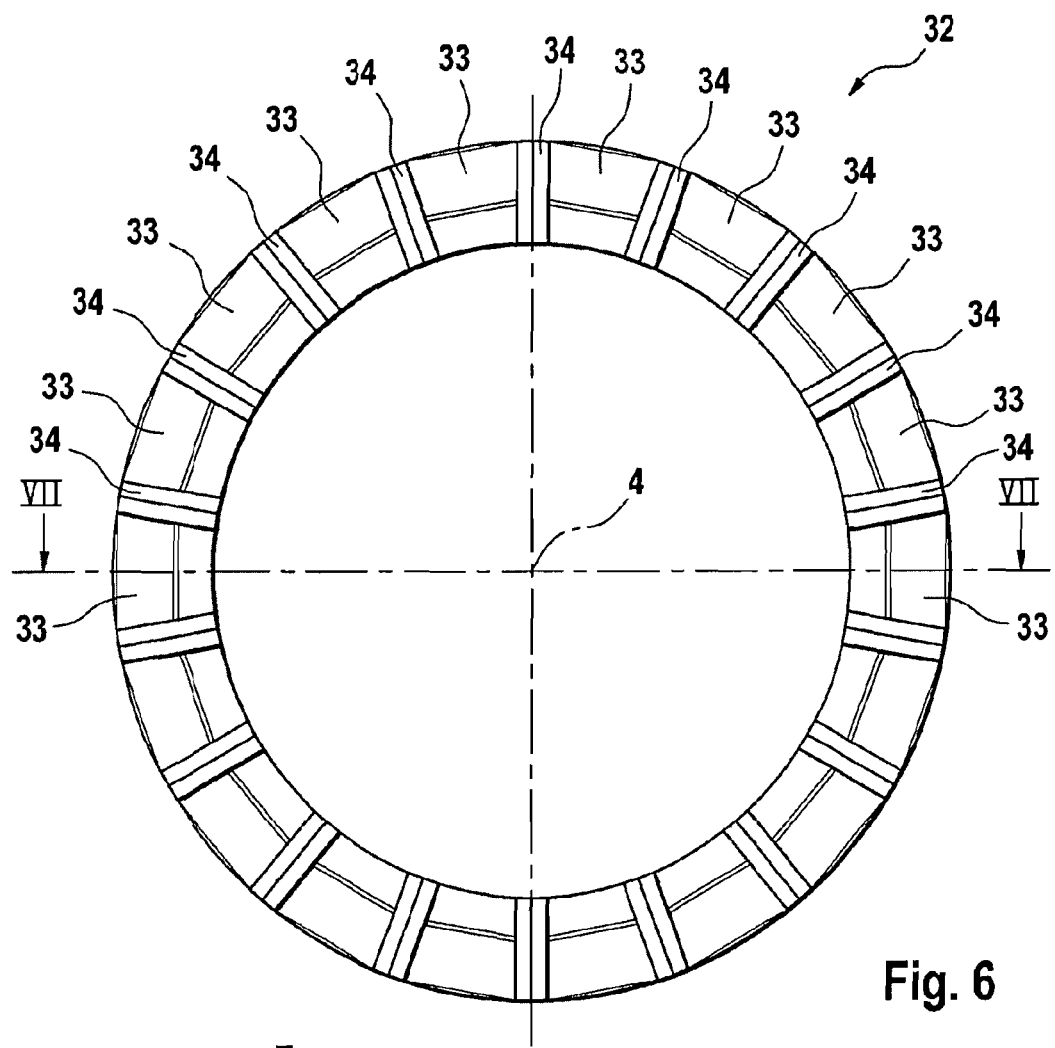
Figure 7:
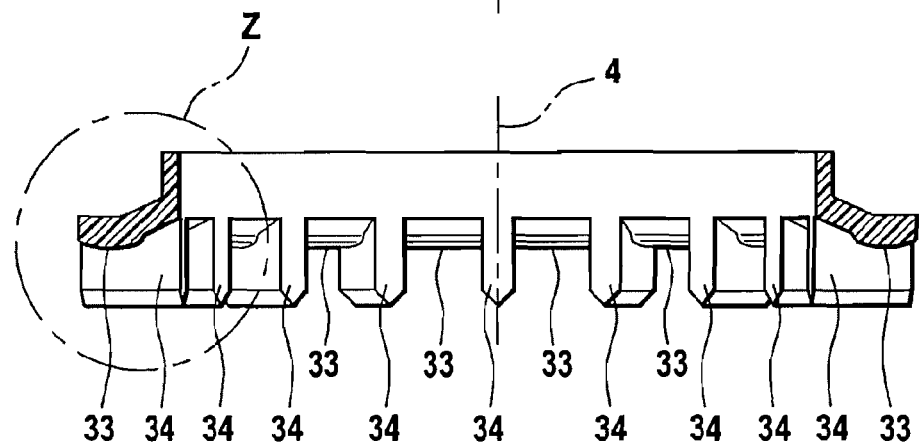

FIG. 6 and FIG. 7 show an annular thrust-carrying piece 32 with peripheral contact surfaces 33 spaced apart from each other. The surface lines of the contact surfaces 33 are aligned tangentially. Between the contact surfaces 33 there are axial projections 34, which taper at the ends into a roof shape.

Figure 8:
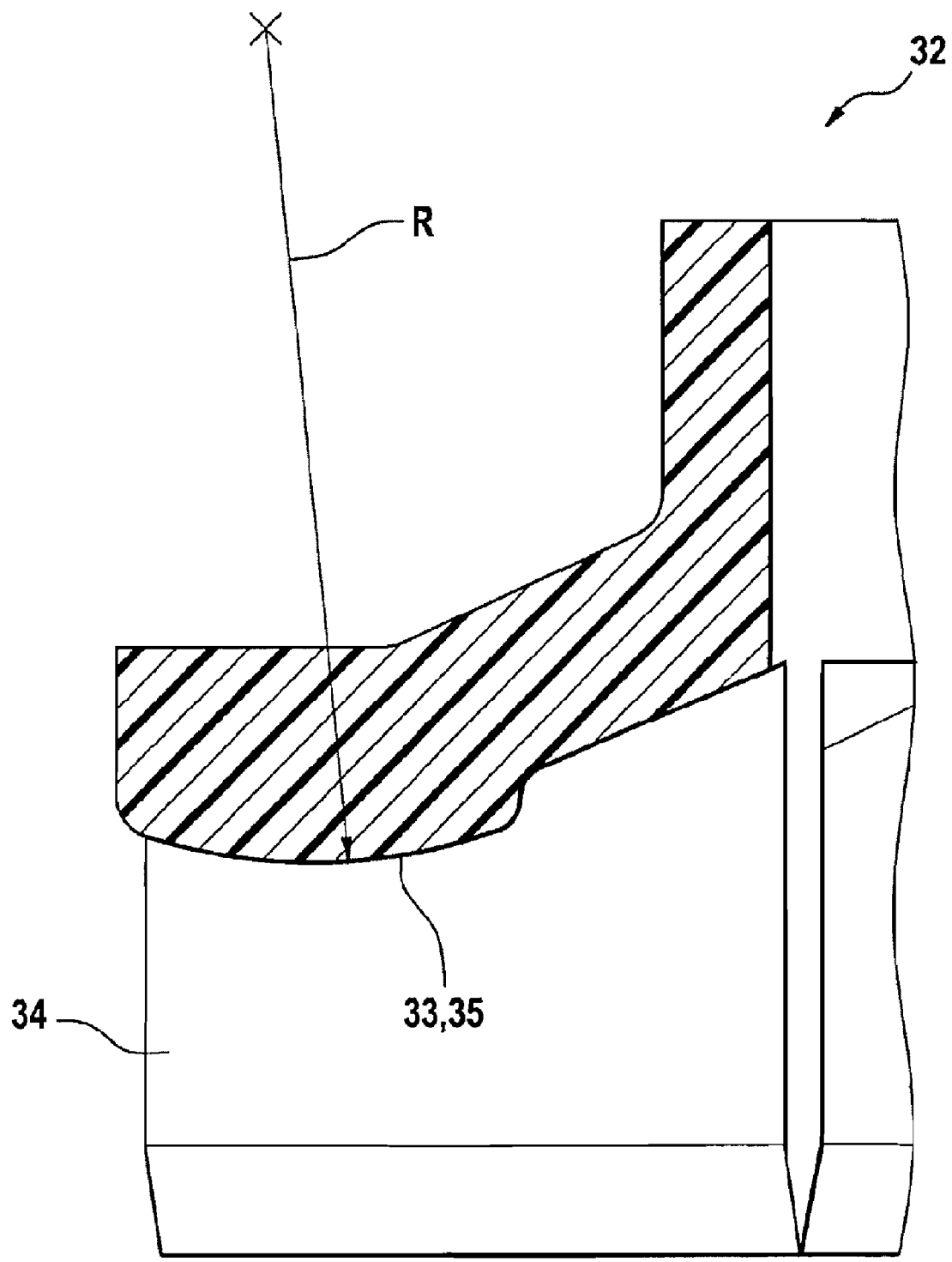

FIG. 8 shows the curvature 35 of the contact surface 33 in a plane aligned parallel to the axis of rotation 4, in this case the plane of the drawing of FIG. 8. The curvature 35 is described by a radius R. The surface lines in a plane perpendicular to the plane of the drawing are aligned in a straight line without curvature. The thrust-carrying piece 32 is fixed at the end to an inner or outer ring by bonding or welding.

Figure 9:
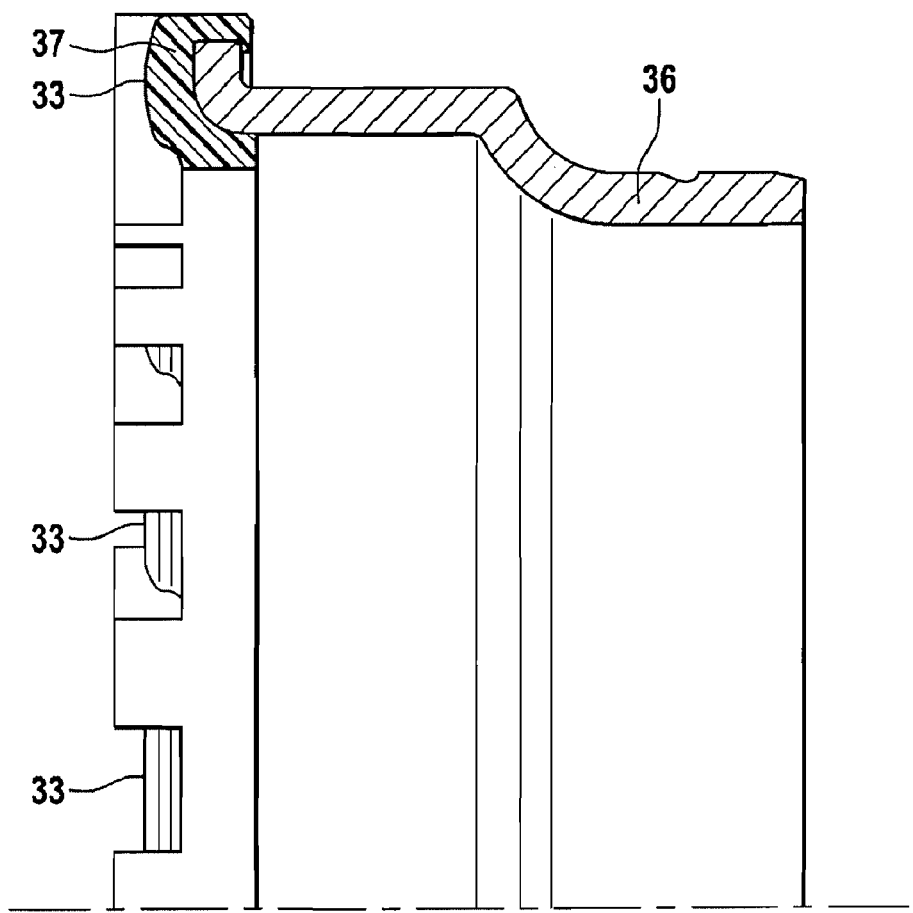

FIG. 9 shows an embodiment of an inner ring 36 with a thrust-carrying piece 37. The thrust-carrying piece has several contact surfaces 33 and is pressed and/or bonded tightly to the inner ring 36.

Figure 10:
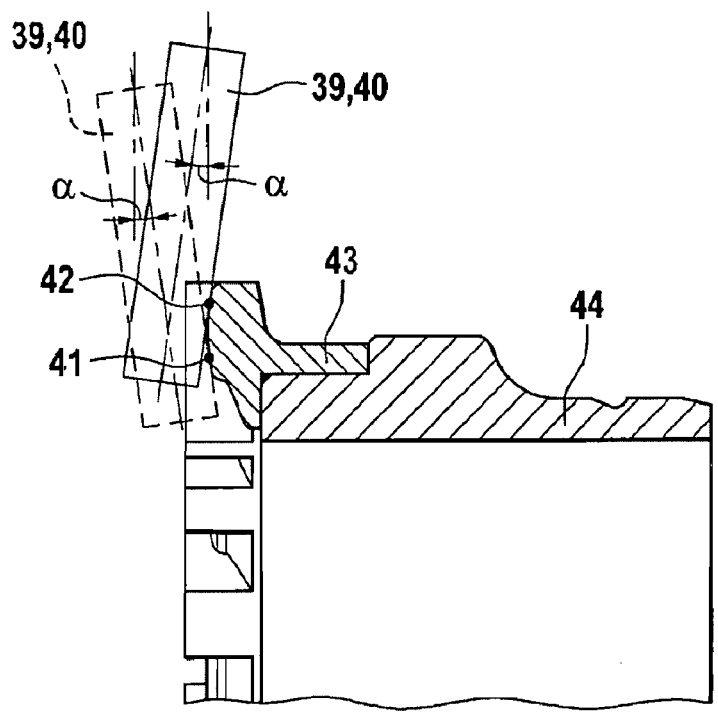

FIG. 10 shows the contact of one end 39 of an only partially shown spring tongue 40 to a contact surface 33. The spring tongues 40 or their ends 39 are in the end positions radially inward or radially outward in linear contacts 41 or 42 with the contact surface 33. The ends 39 are spring mounted in the end positions each by the angle α of arbitrary size. The angle α is preferably 7°-8°. The thrust-carrying piece 43 with the contact surfaces 33 is welded to an inner ring 44.

Figure 11:
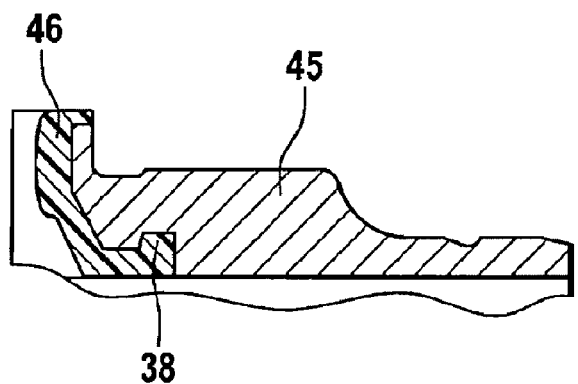

FIG. 11 shows a detail of an inner ring 45, on which a thrust-carrying piece 46 is snapped and held by at least one snap-on element 38. The snap-on element 38 is, for example, a snap-on rim or the snap-on elements are snap-on tabs. Alternatively, the thrust-carrying piece 46 is injection molded.

Figure 12:
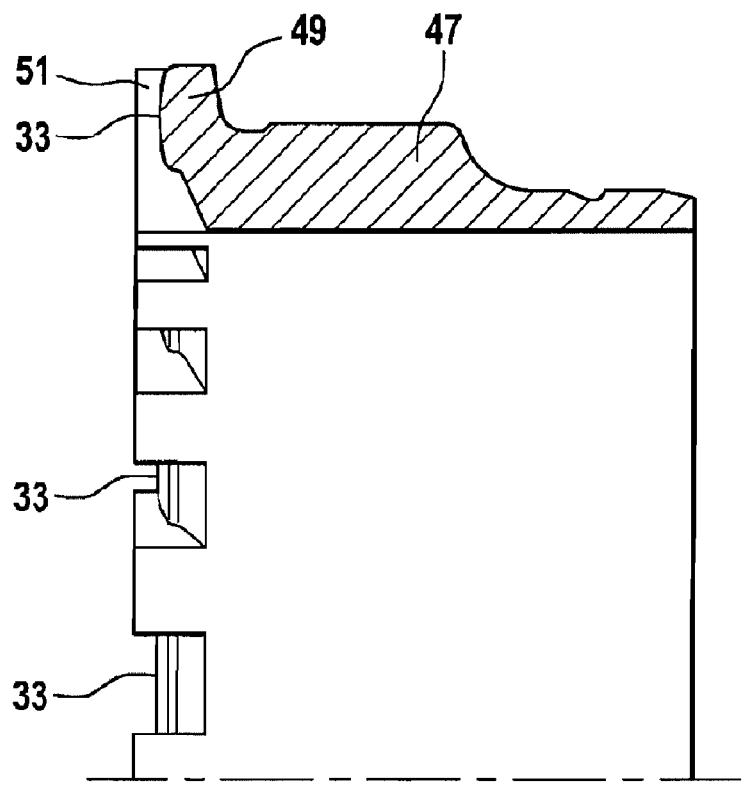
Figure 13:
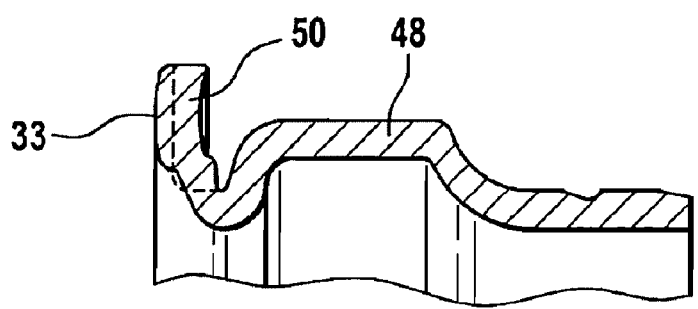

FIGS. 12 and 13 show inner rings 47 and 48, on whose material the contact surfaces 33 are formed directly on a radial rim 49 and 50. The inner ring 47 also has axial projections 51 formed with the inner ring 47 for the positive-fit engagement between the spring tongues of a disk spring. The inner ring 48 is a shaped part, which is produced, for example, through a combined method including deep drawing, pressing, and/or rolling, as well as stamping.

LIST OF REFERENCE SYMBOLS

1 Toroidal body
2 Grid line
3 Grid line
3a Surface line
4 Axis of rotation
5 Surface
6 Linear contact
7 Arrow
8 Contact
9 Contact
10 Arrow
11 Point
12 Contact surface
13 Cylinder
14 Circle/circular plane
15 Axis of rotation
16 Center
17 Surface line
18 Axis of symmetry
18a Intersection point
19 Circumferential line
20 Peak line
21 Clutch release bearing
22 Outer ring
23 Inner ring
24 Balls
25 Cage
26 Release bearing housing
27 Rim
28 Contact surface
29 Bearing ring
30 Contact surface
31 Bevel
32 Thrust-carrying piece
33 Contact surface
34 Projection
35 Curvature
36 Inner ring
37 Thrust-carrying piece
38 Snap-on element
39 End of a spring tongue
40 Spring tongue
41 Linear contact
42 Linear contact
43 Thrust-carrying piece
44 Inner ring
45 Inner ring
46 Thrust-carrying piece
47 Inner ring
48 Inner ring
49 Radial rim
50 Radial rim
51 Projection

The invention claimed is:

1. A clutch release bearing in contact with a disk spring, the clutch release bearing comprises at least one curved contact surface, each of the at least one curved contact surfaces is set at a radial distance to an axis of rotation of the clutch release bearing for contacting a respective at least one end of a respective spring tongue of the disk spring, each of the at least one curved contact surfaces is defined by an arbitrary number of straight surface lines adjacent to each other and aligned parallel to each other on the respective curved contact surface, several of the contact surfaces are arranged about the axis of rotation, and the contact surfaces follow directly adjacent to each other, wherein each of the surface lines of the respective curved contact surface extends in a straight line aligned tangential to imaginary circles and the axis of rotation of the clutch release bearing intersects each of the imaginary circles in respective centers thereof at a right angle.

2. The clutch release bearing according to claim 1, wherein each of the at least one curved contact surface is bulged convexly toward the end of the spring tongue.

3. The clutch release bearing according to claim 1, wherein each of the at least one curved contact surface is described by at least one segment of an outer surface of a respective cylinder, wherein an axis of symmetry of the respective cylinder is aligned tangential to an imaginary circumferential line extending about the axis of rotation and wherein the axis of symmetry extends parallel to the surface lines of the respective contact surface.

4. The clutch release bearing according to claim 3, wherein the parallel spacing between the axis of symmetry and each of the surface lines of each of the at least one curved contact surface is at least 5 mm.

5. The clutch release bearing according to claim 1, further comprising at least one inner ring and at least one row of roller bodies rolling on the inner ring, the at least one curved contact surface is constructed on an end of the inner ring extending in the axial direction.

6. The clutch release bearing according to claim 5, wherein the at least one curved contact surface is constructed on a radial rim of the inner ring produced from sheet metal without cutting through shaping.

7. The clutch release bearing according to claim 6, wherein a plurality of the curved contact surfaces are constructed directly on the radial rim.

8. The clutch release bearing according to claim 6, wherein the at least one curved contact surface is provided with a wear-resistant surface.

9. The clutch release bearing according to claim 5, wherein the at least one curved contact surface is constructed on at least one thrust-carrying piece connected to the inner ring.

10. The clutch release bearing according to claim 9, wherein the thrust-carrying piece is annular and made from plastic.

11. The clutch release bearing according to claim 10, wherein the plastic is a thermoplastic.

12. The clutch release bearing according to claim 9, wherein the thrust-carrying piece is made from hard metal.

13. A clutch release bearing in contact with a disk spring, the clutch release bearing comprises at least one curved contact surface, each of the at least one curved contact surfaces is set at a radial distance to an axis of rotation of the clutch release bearing for contacting a respective at least one end of a respective spring tongue of the disk spring, each of the at least one curved contact surfaces is defined by an arbitrary number of straight surface lines adjacent to each other and aligned parallel to each other on the respective curved contact surface, wherein each of the surface lines of the respective curved contact surface extends in a straight line aligned tangential to imaginary circles and the axis of rotation of the clutch release bearing intersects each of the imaginary circles in a center thereof at a right angle, wherein several of the contact surfaces are arranged about the axis of rotation, and the contact surfaces follow one another spaced apart from each other, and a radially extending axial projection that projects axially beyond the contact surfaces is constructed between at least two of the contact surfaces following each other.

14. The clutch release bearing according to claim 13, wherein the projection tapers in the axial direction into a roof shape.

* * * * *